United States Patent
Newsome

[11] Patent Number: 5,865,300
[45] Date of Patent: Feb. 2, 1999

[54] PRESSER ASSEMBLY FOR TURNING CONVEYORS

[76] Inventor: John R. Newsome, R.R. #1, Box 119, Shumway, Ill. 62461

[21] Appl. No.: 720,951

[22] Filed: Oct. 4, 1996

[51] Int. Cl.$^6$ .................................................... B65G 21/20
[52] U.S. Cl. ......................................... 198/836.1; 271/250
[58] Field of Search .................................... 198/412, 415, 198/6.33, 836.1, 836.2, 836.3, 624; 271/250, 273

[56] References Cited

U.S. PATENT DOCUMENTS

| | | | |
|---|---|---|---|
| 1,756,653 | 4/1930 | McArthur | 198/787 |
| 2,954,113 | 9/1960 | Hibbard et al. | 198/189 |
| 3,170,562 | 2/1965 | Eyster | 198/127 |
| 3,591,165 | 7/1971 | McCahon et al. | 270/54 |
| 3,605,980 | 9/1971 | Donahue et al. | 198/20 |
| 3,976,254 | 8/1976 | Hench, Sr. et al. | 198/624 X |
| 3,977,665 | 8/1976 | Bowman et al. | 270/4 |
| 4,163,550 | 8/1979 | Armstrong | 198/836.2 X |
| 4,436,200 | 3/1984 | Hodlewsky et al. | 198/851 |
| 4,640,056 | 2/1987 | Stump | 51/138 |
| 5,180,154 | 1/1993 | Malick | 271/250 X |
| 5,275,395 | 1/1994 | Boggiano et al. | 271/259 |
| 5,312,223 | 5/1994 | Kleinhen | 414/788.3 |
| 5,392,700 | 2/1995 | Kleinhen | 100/7 |

FOREIGN PATENT DOCUMENTS

| | | | |
|---|---|---|---|
| 4-350012 | 12/1992 | Japan | 198/836.3 |

*Primary Examiner*—James R. Bidwell
*Attorney, Agent, or Firm*—Leydig, Voit & Mayer, Ltd.

[57] ABSTRACT

A presser assembly for a turning conveyor comprises multiple presser rollers that are mounted with the axis of rotation of each roller generally parallel to a radius of the turn and at sufficiently close spacings that each article is pressed against the conveyor by at least one of the presser rollers at all times during its traverse of the conveyance path around the turn. Positive turn-gripping of each article is attained by use of resiliently compressible presser rollers having significant width and which are tapered, sized and canted such that the presser-contact segment of its periphery is parallel to the underlying conveyance surface and moves in the same direction and at the same velocity as the underlying segment of the conveyor, across the full width of the roller, whereby each article is maintained in the same orientation relative to the underlying conveyor throughout the turn. Each of the rollers is mounted for free floating action toward and away from the conveyor surface, and all of the presser rollers are mounted on one vertically adjustable support whereby all are simultaneously adjustable vertically to accommodate articles of significantly different thicknesses.

27 Claims, 3 Drawing Sheets

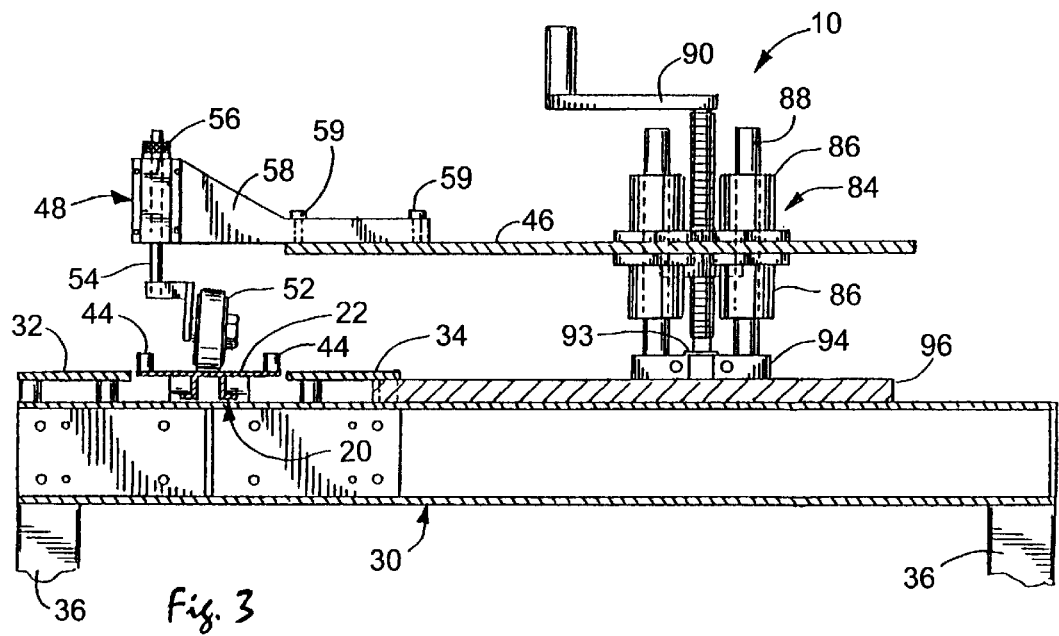
Fig. 3
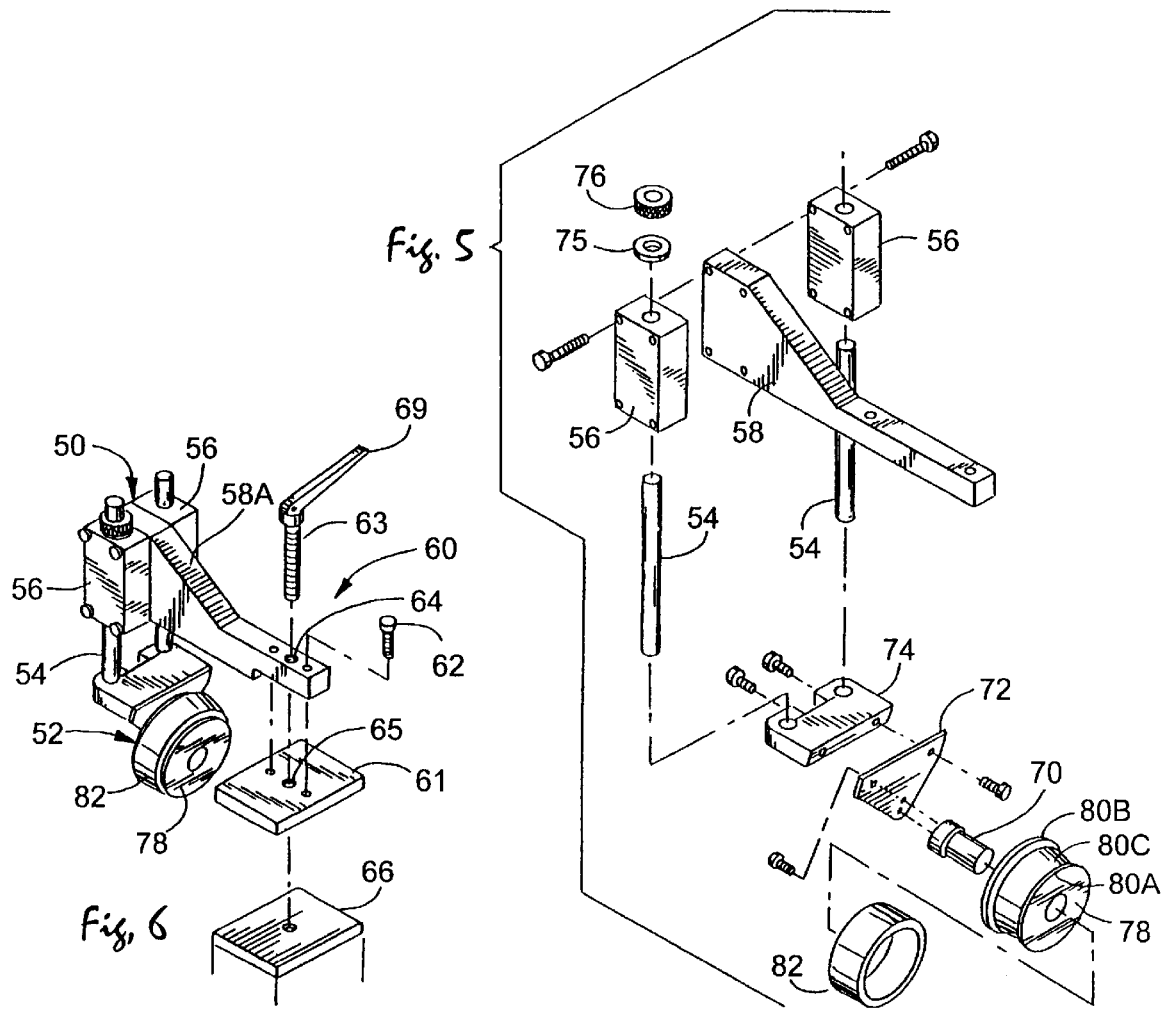
Fig. 5
Fig. 6

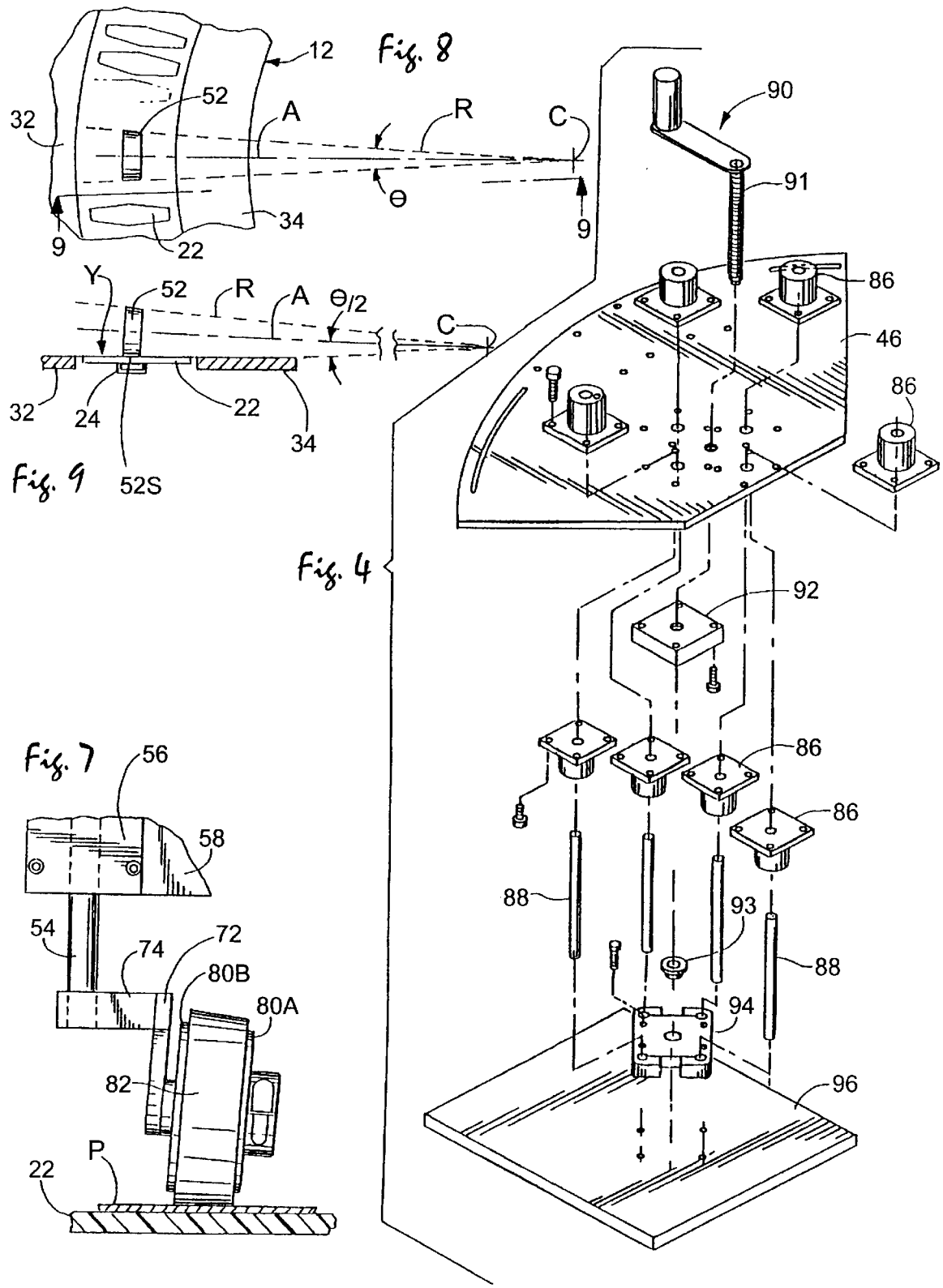

# PRESSER ASSEMBLY FOR TURNING CONVEYORS

FIELD OF THE INVENTION

This invention relates to arrangements for controlling articles being carried around corners on conveyors, and particularly to conveyor assemblies designed for use in the printing industry and similar circumstances for conveying flat articles such as flyers, booklets, signatures or books and the like around turns.

BACKGROUND OF THE INVENTION

There are many circumstances where it is desired to turn articles such as sheets of paper, flyers, signatures, booklets, books or the like as they are conveyed around a corner while maintaining the orientation of those articles relative to the conveyor. A variety of turning conveyers are available for these general purposes, including so-called slat-top chain conveyors, flat belt conveyors, live-roller conveyors and, in some circumstances, articulated segment conveyors. The latter may include interfitted articulated segments or overlapping fish-scale type segments and normally are used primarily for conveying relatively large objects.

In many of the applications for turning conveyors, it is desirable to convey articles around turns through various angles, up to at least 180°, with relative short turning radii to save space, and at high speeds to save time, while maintaining each article in a predetermined orientation relative to the underlying conveyor, e.g., from the input into the turn to the output from the turn. It is also desirable to minimize or avoid the need for side guides to force the product around a turn and to minimize or avoid significant banking of the conveyor as it traverses a turn. The articles being conveyed may be shingled or spaced individual items of various sizes, and may be of varying thicknesses. Accordingly, it is desirable to readily accommodate variations in the thickness as well as the size of the articles.

OBJECTS AND SUMMARY OF THE INVENTION

The general object of the present invention is to provide a gripping arrangement for maintaining articles in a predetermined orientation on a turning conveyor as the articles traverse a corner on such a conveyor.

Another object is to provide such positioning of the articles while allowing small variations in the thickness of the articles during each run.

It is yet another object to provide for maintaining such positioning of the articles without the need of side guides to confine the articles and without banking the conveyor while maintaining the positive orientation control for small lightweight objects turning relatively short corners, i.e., corners having small radius turns, at high speeds.

A further object is to provide convenient adjustment for gripping of articles of significantly varying thicknesses on a turning conveyor.

These and other objects and advantages of the invention will become more apparent from the following description and the accompanying drawings.

A presser assembly is provided for pressing articles such as paper products against the surface of a turning conveyor as they traverse a turn of that conveyor. The assembly includes multiple presser rollers which are mounted with the axis of rotation of each of the rollers generally parallel to a radius of the turn. These rollers are distributed along the turn path at sufficiently close spacings that each article is engaged by at least one of the presser rollers at all times during its traverse of the conveyance path around the corner. By assuring continuous pressure engagement of each article against the turning conveyor throughout the turn, each product is maintained in the same orientation relative to the underlying conveyor from the input, around the turn, and into the output from the turn.

Each presser roller presses each article against the underlying portion of the conveyor at points spaced laterally of the conveyance path, throughout the turn, to maintain the orientation of the article as it traverses the turn. This manner of engagement provides controlling torque to assure that the articles turn coordinately with the turning motion of the conveyor around the corner.

In the presently preferred embodiment, the positive turn-gripping is attained by use of presser rollers having significant width and which press the underlying articles against the conveyor surface over that entire roller width. In addition to having its axis of rotation oriented along a radius of the turn, each of the rollers is sized, tapered and canted such that the pressercontact segment of its periphery is parallel to the underlying conveyance surface and moves in the same direction and at the same velocity as the underlying segment of the conveyor, across the full width of the roller, as the roller rotates in pressing engagement with an underlying article. To this end, the outer peripheral presser surface of each roller effectively may be perceived as a truncated segment of a right circular cone that has its vertex at the center of curvature of the arcuate conveyor path and in the plane of the conveyor surface, with one side of the cone resting on the conveyor surface and the axis of rotation of the roller being substantially coincident with the center axis of that cone.

Each of the rollers has a resiliently compressible periphery to provide good gripping action while accommodating minor variations in thickness of successive individual articles in the course of operation. Each of the rollers is mounted for free floating action toward and away from the conveyor surface, to allow for unusual circumstances such as accumulations or "jams" of product as well as further accommodating products of varying thickness during a single run. In addition, in the presently preferred embodiment, all of the presser rollers are maintained in their predetermined radial positions and simultaneously are adjustable vertically for accommodating products of significantly different thicknesses by being mounted on one vertically adjustable support.

While the invention is susceptible to various modifications and alternative constructions, a preferred embodiment has been shown in the accompanying drawings and will be described in detail. It will be understood, however, that there is no intention to limit the invention to the specific embodiment, but on the contrary the intention is to cover all modifications, alternative constructions and methods and equivalents falling within the spirit and scope of the invention.

BRIEF DESCRIPTION OF THE DRAWINGS

FIG. 3 is a sectional view taken generally along lines 3—3 of FIG. 2.

FIG. 4 is an exploded perspective view of the support and adjustment mechanism of the presser assembly in the apparatus of FIG. 1.

FIG. 5 is an exploded perspective view of the components of one presser wheel subassembly of the apparatus of FIG. 1.

FIG. 6 is a partially exploded perspective view of an adjustable presser wheel subassembly of the apparatus of FIG. 1.

FIG. 7 is an enlarged side view of a portion of one of the presser wheel subassemblies.

FIG. 8 is a schematic plan view illustrating the relationship of a presser roller to the arcuate turning path of the apparatus of FIG. 1.

FIG. 9 is a partial sectional side view taken generally along line 9—9 of FIG. 8, further showing the relationship of a presser roller to the arcuate turning path of the apparatus of FIG. 1.

DETAILED DESCRIPTION OF THE PREFERRED EMBODIMENT

Figure 1:
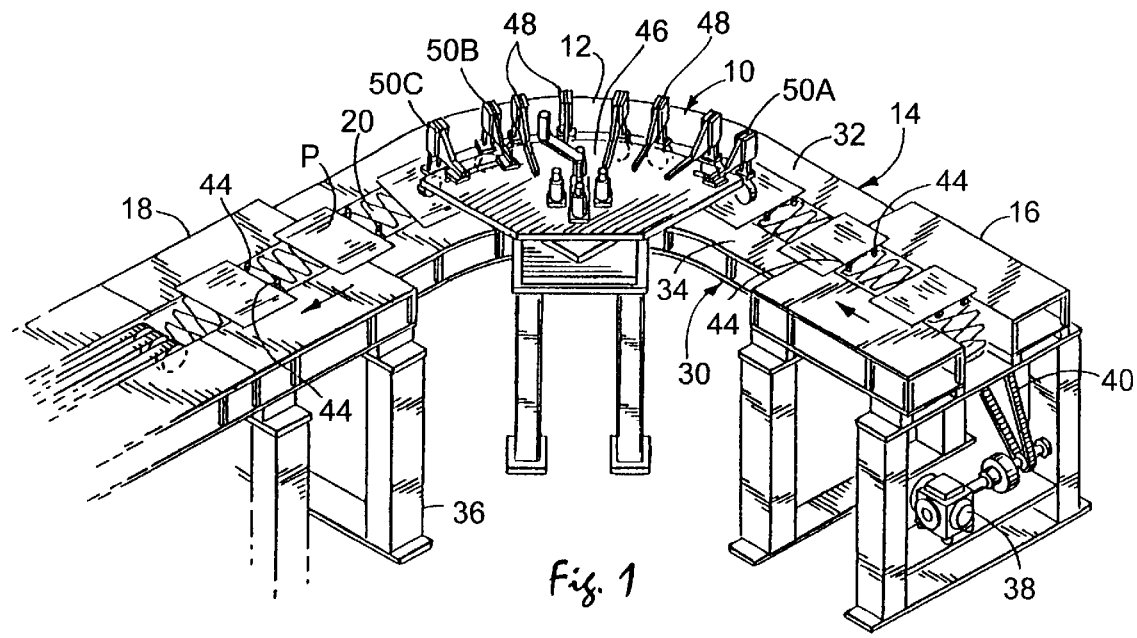
FIG. 1 is a perspective view of a portion of a turning conveyor with a presser assembly, employing teachings of this invention.

For purposes of illustration, a presently preferred embodiment of the invention is shown in the drawings as comprising a pressor assembly 10 mounted on the arcuate corner portion 12 of a flat, horizontal slat chain conveyor 14. In the conveyor 14, the arcuate section 12 traverses a 90° segment of a circular arc for carrying lightweight articles P thereon around a corner, i.e. a substantial change in the direction of conveyance of those articles from an input or feeder conveyor run or section 16 to an output run or section 18. The articles, e.g. papers, brochures, signatures, booklets or books, are maintained in a predetermined orientation relative to the path of the conveyor from the input section 16 through the turning section 12 and into the output section 18. In the illustrated embodiment, this orientation is with the articles P lying transverse to the path of the conveyor, i.e. normal to the path, whereby the articles turn 90° as the conveyor turns in traversing the corner section 12. The articles maintain their orientation relative to the support conveyor throughout their traverse of the illustrated conveyor path.

The illustrated conveyor 14 utilizes an endless slat chain 20 as the moving conveyance element. The chain assembly 20 includes a series of slats 22 each individually mounted on extended portions of the transverse pivot pins of a roller chain 24 upon which the slats 22 are essentially centered. Each of the carrying slats 22 is tapered from a wide central portion to narrower outer ends to accommodate flexing and thus articulation of the conveyance chain around turns. The taper of the slats together with the lateral flexibility of the roller chain allows relative angular articulating movement of adjacent slats and the related chain links for traversing an arcuate conveyance path, e.g., as shown in the corner portion 12 of the conveyor 14. Such slat chain conveyors are generally known in the art; see for example U.S. Pat. Nos. 2,954,113 and 4,436,200, the disclosures of which are incorporated herein by reference. The specific form of slat chain mechanism 20 illustrated herein is a "Series 1873 Chain" currently marketed by Rexnord Inc. of Milwaukee, Wis. The subject invention is believed to be applicable in and with other types of conveyors designed for carrying products around a corner or through a turn in the same general manner, including those referred to in the "Background" section hereinabove. For convenience, such conveyors are referred to herein as "cornering conveyors" or "turning conveyors".

In the illustrated apparatus, the endless slat chain 20 is mounted in an appropriate support frame 30 to present an upwardly exposed support surface defined by the slats 22 of the upper run of the slat chain in a flat horizontal plane. Horizontal side plates 32 and 34 are provided along each side of each conveyance run of the slat chain 20 for slidably supporting the outer ends of articles P that extend beyond the ends of the slats 22, as illustrated. The upper surface of the plates 32 and 34 are substantially co-planar with the upper surfaces of the slats 22 for this purpose. A suitable support framework, such as stands 36, supports the entire assembly. A suitable power drive input, such as the motor 38, drives the slat chain belt, such as through a timing belt drive 40.

Some or all of the conveyor plates 20 may be provided with holes as at 42 (FIG. 2), for selective mounting of pusher lugs 44. Such lugs or other upstanding pusher elements may be provided on certain of the carrier plates 22 at appropriate spacings along the chain for maintaining appropriate spacing of individual articles being conveyed. Such lugs or similar pushing elements may be omitted or removed when conveying a continuous stream of flat articles, such as paper articles in shingled array with one another.

The presser assembly 10 is provided atop the conveyor 14 for holding and controlling the articles in place on the conveyor as they traverse the turn portion 12. The presser assembly 10 includes a main support plate 46 which carries a plurality of fixed presser subassemblies 48 and three adjustable presser subassemblies 50 that are designated 50A, 50B and 50C. The fixed presser subassemblies 48 are identical to one another and are designed for mounting at fixed angular positions on the support plate 46. Each of the adjustable presser subassemblies 50 is of the same construction as the presser subassemblies 48, except for modifications which provide for adjusting the positions of the subassemblies 50.

As perhaps best seen in FIGS. 3, 5, 6 and 7, each of the presser subassemblies 48 includes a nip roller 52 mounted for free vertical reciprocating motion relative to the common support plate 46 upon which it is supported. To that end, each subassembly 48 includes a pair of vertical slide shafts 54 that are vertically slidable in a pair of vertical bearings 56 which are mounted on a bearing plate 58. Each bearing plate 58 is affixed to the main support plate 46, as by a pair of bolts 59, to mount the subassemblies 48 in their predetermined radial positions.

Referring particularly to FIG. 6, each of the adjustable presser subassemblies 50 differs from the subassemblies 48 in that the subassemblies 50 utilize a foreshortened bearing plate 58A which carries an upper guide plate 61 secured thereto, such as by bolts 62. A threaded bolt 63 passes freely through openings 64 and 65 through the bearing plate 58A and guide plate 61, respectively, and threadably engages a fastener or clamping plate or nut 66 for clamping engagement of the respective subassembly 50 in a selected position on the support plate 46. Each adjustable subassembly 50 is mounted with its guide plate 61 atop the support plate 46. The respective bolt 63 passes through an arcuate slot 67A or 67B through the plate 46, and engages the respective clamp fastening plate 66 therebeneath whereby tightening of the bolt 63 firmly clamps the respective subassembly 50 in its desired radial position. A handle 69 is provided on each bolt 63 for convenient manual securement, release and adjustment of the adjustable presser subassemblies, as referred to further below.

In each of the presser assemblies 48 and 50, the respective roller 52 is mounted for rotation about a roller shaft 70 that is affixed to a side frame 72. The side frame 72 is affixed to a clamp block 74 that is affixed to the lower end of the respective pair of vertical slides 54. A resilient bumper ring 75 and a clamp collar 76 are mounted on the upper end of one of the slides 54 for supporting the slidable roller assembly on the bearing blocks 56 when the respective roller is not in engagement with an underlying article or structure.

Each of the rollers 52 is of a tapered or truncated conical configuration. Each includes a roller body 78 having radially extending inner and outer annular edge flanges 80A and 80B at opposite ends of a truncated conical rim 80C. Flange 80A is of lesser outside diameter than flange 80B. A resilient peripheral band or "belt" 82 is confined between the flanges 80A, 80B and protrudes radially outward thereof to provide resilient cushioned pressing engagement with article P on the conveyor beneath the roller 52. For example, the band 82 may be fabricated of a resilient silicone foam. In this embodiment, the resilient band 82 is of uniform thickness. Prior to mounting on the roller 78, the band 82 is of a uniform cylindrical annular configuration. Due to its resilience, it fits snugly on the rim 80C, between the flanges 80A and 80C whereby the outer surface reflects and substantially conforms to the taper of the outer tapered surface of rim 80C. A tapered form of band 82 also could be used. The band 82, and particularly its outer circumferential surface, forms the presser surface of the roller 52.

The outer peripheral surface of each band 82 and thus of each roller 52 defines a truncated right cylindrical conical presser surface having a central axis coincident with the axis of the roller shaft 70 and hence of the axis of rotation of the respective roller 52. The lowermost segment of this presser surface defines the "nip" for engagement of an article P on the conveyance surface of the slats 22. The axis of rotation of each roller is canted downward in the radially inward direction relative to the turn section 12 such that the lowermost segment of its presser surface is parallel to the adjacent conveyance surface; see FIG. 7. Each resilient band 82 provides a resilient cushioned pressure engagement and gripping surface against articles on the conveyor. It will form a gripping "footprint" of a perceptible "length" in the direction of movement of the articles P due to the compressive yielding nature of the band under the gripping pressure afforded by the weight of the respective freely reciprocable roller unit.

Each roller 52 engages the articles P over the full axial width of the band 82 to assure maintenance of the orientation of the product relative to the conveyance surface as the latter gradually turns in its progression around the arcuate path of the section 12. The effective diameter of each roller 52, and hence the length of its circumference, varies across the width of its tapered nip contact surface. This variation preferably is directly proportional to the variation in the effective radii of the conveyance path across the radial width of the contact surface. Accordingly as the roller rotates in nip contact with the articles, each intervening article is gripped between the presser roller and the underlying moving conveyor surface without relative slippage at any point across the width of the roller. Thus the orientation of each article relative to the underlying conveyor elements is maintained throughout the turn of the conveyor section 12, and each article so gripped is turned coordinately as the direction of conveyance movement gradually changes during traverse of the arcuate path.

FIGS. 8 and 9 illustrate the desired theoretical relationship between each roller 52 and the arcuate conveyor path. In these illustrations, C is the center of the arc of curvature of the respective conveyor portion 12. The point C is in the conveyance plane defined by the surfaces of the slats 22. The dashed lines outline a right circular cone R which has its vertex point coincident or substantially coincident with the center point C and one tangent edge laying along the conveyance plane Y. The cone R has a small included vertical angle θ. The roller 52 is a truncated section of the cone R and has its axis of rotation coincident or substantially coincident with the center axis A of the cone R. Thereby the angle of cant of the roller axis to the conveyance plane equals the semivertical angle θ/2 and the presser surface of the roller at 52S is correspondingly parallel to the conveyance plane Y.

In a specific embodiment as illustrated in the drawings and described above, the angle θ was about 7°, with a conveyance path having a radius of about 30" to the centerline corresponding to the path of the roller chain 24. Accordingly, the semivertical angle θ/2 was about 3.5° in the above example. In that embodiment, each roller 52 had a nominal diameter of 2.5" at the midplane of the rim 80C, which was tapered at a θ/2 angle of 3.5°. The end flanges 80A and 80B extended radially about 0.25" beyond the outside diameter of the rim 80C at its respective end. The band 82 was of a uniform radial thickness of about 0.5" and formed of a resilient silicone foam material. The band 82 fit snugly on the rim 80C and against the end flanges 80A and 80B, and provided a tapered outer truncated conical surface parallel to the rim 80C and hence conforming to the conical angle θ of about 7°, with a midplane nominal diameter of about 3.5". This embodiment operated satisfactorily in conveying signatures and booklets.

Figure 2:
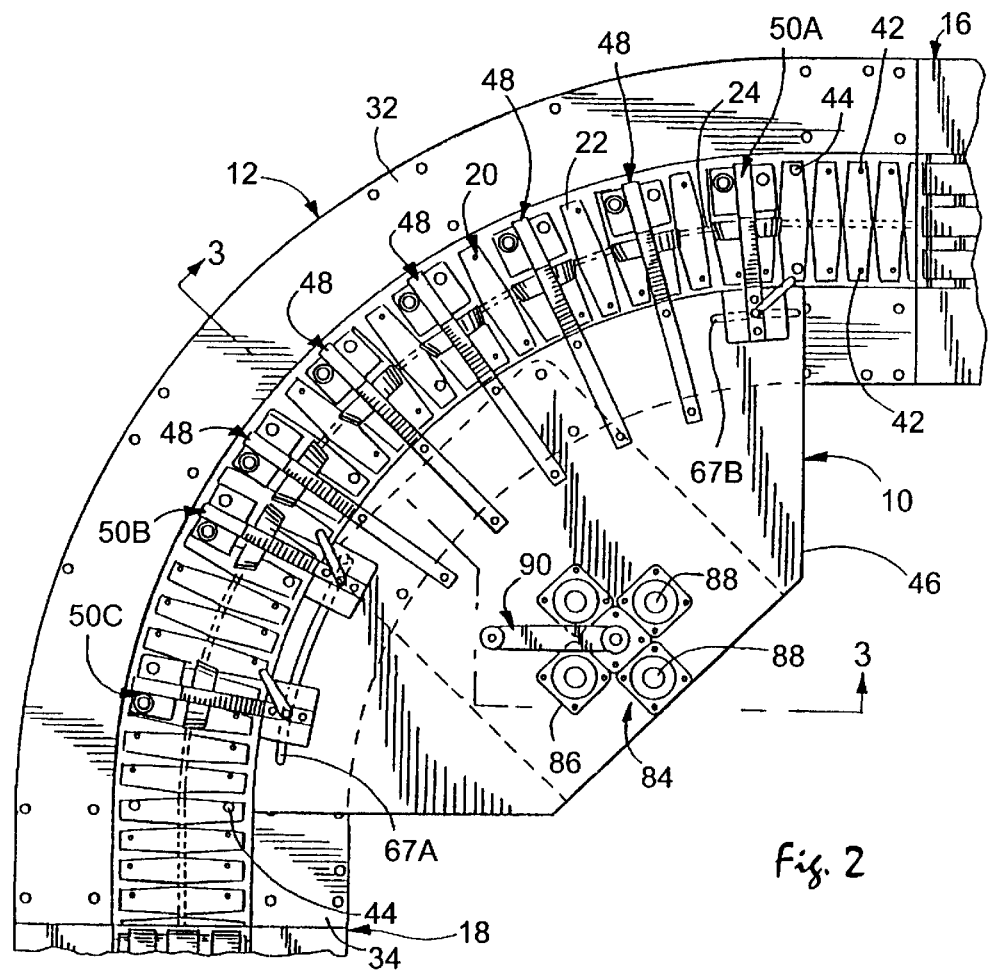
FIG. 2 is a top plan view of the apparatus of FIG. 1.

Referring particularly to FIG. 2, each of the bearing plates 58, 58A is mounted on the support plate 46 such that the axis of rotation of the respective roller is in a radial plane which is normal to the conveyance plane and extends radially of the arcuate path traversed by the slat chain 20. The presser rollers above the turning section thus are disposed along angularly spaced radii as illustrated, and are sufficiently close together relative to the width of each article P being conveyed (as measured along the conveyance path) that each product is continually engaged by at least one roller 52 during its traverse of the arcuate section 12. The radial positions of the presser rollers of subassemblies 48 are fixed, as noted above. Adjustable presser subassemblies 50 are provided adjacent to the input and output ends for ready circumferential adjustments of their radial plane positions to accommodate the transition of the products to and from the adjacent straight conveyor sections 16 and 18.

Referring particularly to FIGS. 3 and 4, all of the presser subassemblies 48 and 50 are mounted on the plate 46 for simultaneous collective generally vertical adjustment by a support screw and multiple slide bearing array 84. This affords adjustment of the entire presser assembly 10 to accommodate articles of different basic thicknesses, as distinguished from the thickness variations which are accommodated by the slide mountings 54–56 of the individual presser rollers. In this general adjustment mechanism, four pairs of vertical slide bearings 86 are affixed to the main support plate 46 and engage four fixed mutually parallel vertical slide rods 88 to maintain the presser assembly 10 in parallel relationship to the conveyor surface as the presser assembly is adjusted vertically. Convenient vertical adjustment is provided by a hand crank 90 which includes a threaded shank 91 that engages a threaded nut 92 that is affixed to the underside of the plate 46. The shank 91 rests upon a bearing 93 that is supported on a shaft clamp block 94. The block 94 also clamps the vertical slide rods 88 in position and is suitably supported, such as by being affixed to a support plate 96 that in turn is mounted on the conveyor frame 30.

While the conveyor 10 is illustrated with a 90° circular arc turning section 12, it should be appreciated that a variety of other arcuate turning configurations may be utilized having various and even varying radii and which may traverse turns of lesser or much greater degrees, e.g. up to about 180° in flat horizontal turns, and greater degrees of turning, e.g. up to a 360° or more in spiral turns in some instances. Also, such a turning section may be connected directly to devices other than straight input and output conveyor sections such as sections 16 and 18. For example, the connecting devices may be other types of conveyors, or feeders, stackers, printers or other processing equipment.

Also, while the preferred embodiment of this invention is shown in conjunction with a turning conveyor having an essentially horizontal planar conveyance path, the invention also may be implemented on conveyors which are banked, i.e. having a conveyance path which is banked (inclined transversely relative to the horizontal), as well as conveyance paths which incline or decline in the direction of conveyance. Further, while the engagement pressure of the individual roller units preferably is attained by the weight of those units in the illustrated free vertical free sliding arrangement, it will be appreciated that other techniques of mounting the presser rollers may be unitized, such as by adding pressure springs and/or by mounting the rollers in other fashions, so long as the appropriate relationship of the individual rollers to the arcuate conveyance path is maintained.

In applying the invention to cornering conveyors or turning conveyors of other types, the presser rollers would be similarly positioned over the conveyance elements which carry the articles around the corner or turn of the conveyance path. Application to a turning conveyor having laterally tapered conveyance rollers preferably would entail positioning each tapered pressure roller directly over one of the conveyance rollers. In such a conveyor, the tapered conveyance rollers collectively define the arcuate conveyance path.

It is possible that the tapered pressure rollers could be driven rather than being idling rollers in some circumstances. However, the use of idling pressure rollers as illustrated is preferred for its simplicity and effectiveness.

From the foregoing it can be seen that presser assemblies for turning conveyors have been provided which accomplish the aforenoted objects of this invention.

It will be understood that other variations, modifications and substitutions of equivalent configurations can be effected within the spirit and scope of this invention, particularly in light of the foregoing teachings. It is contemplated by the following claims to cover any such modifications and other embodiments that incorporate those features which constitute the essential features of the invention within the true spirit and scope of the claims.

What is claimed is:

1. A presser assembly for engaging articles while those articles traverse an arcuate conveyance path on a surface of a turning conveyor, said presser assembly, comprising:

multiple presser rollers each mounted for rotation about an axis which is oriented generally radially of such an arcuate conveyance path, said presser rollers being disposed in spaced relation to one another along such arcuate conveyance path and positioned with their respective axes of rotation at angles to one another along such arcuate conveyance path to press such articles against the surface of such a conveyor and to maintain the orientation of each such article relative to the conveyor and thereby turn such articles coordinately with the turning motion of the conveyor as such articles traverse such an arcuate conveyance path on the conveyor surface.

2. The invention as in claim 1 wherein the spacing between adjacent ones of said rollers is less than the width of such articles as measured along said arcuate conveyance path.

3. The invention as in claim 1 wherein each said presser roller has a resiliently compressible periphery.

4. The invention as in claim 3 wherein each of said presser rollers has a significant width as measured radially of such arcuate conveyance path for pressing such articles against such a conveyor surface over said width, each of said presser rollers varying in effective diameter across said width in direct proportion to the radii of such arcuate conveyance path adjacent that presser roller, whereby each said presser roller holds such articles against such a conveyor surface in a fixed orientation relative to the conveyor as the articles move with said conveyor along said arcuate conveyance path.

5. The invention as in claim 1 wherein each of said presser rollers has a truncated conical peripheral presser surface of significant width for engaging such articles on such an arcuate conveyance path and is oriented with its end of lesser diameter disposed radially inward and its end of greater diameter disposed radially outward relative to said arcuate conveyance path, each of said preser rollers being mounted with its axis of rotation disposed at an angle to the surface of the conveyor adjacent to that roller such that the portion of said peripheral presser surface which is nearest to such adjacent conveyor surface is substantially parallel to such adjacent surface of the conveyor, and wherein the effective diameter of each of said presser rollers varies across the width of said presser surface thereof in direct proportion to the radii of such arcuate conveyance path across the corresponding portion of such arcuate conveyance surface that is adjacent said presser surface, whereby such articles engaged by said presser rollers are maintained in substantially the same lateral orientation relative to such a conveyor as they traverse said arcuate conveyance path while pressed against the conveyor surface by said presser rollers.

6. The invention as in claim 5 wherein each said presser roller has a resiliently compressible periphery.

7. The invention as in claim 1 wherein each of said presser rollers has a truncated conical peripheral presser surface of significant width for engaging such articles on such an arcuate conveyance path and is oriented with its end of lesser diameter disposed radially inward and its end of greater diameter disposed radially outward relative to said arcuate conveyance path, each of said presser rollers being mounted with its axis of rotation disposed at an angle to the surface of the conveyor adjacent that roller such that the portion of said peripheral presser surface thereof nearest to such adjacent conveyor surface is substantially parallel to such adjacent surface of the conveyor, said presser rollers thereby defining an arcuate presser path of significant width as measured radially of said path, and wherein the proportionate differences in the effective diameters of each of said rollers across the width of said arcuate presser path ire substantially the same as the proportionate differences of the lengths of said arcuate presser path across its width, whereby such articles engaged by said presser rollers are maintained in substantially the same lateral orientation relative to such a conveyor as they traverse said arcuate conveyance path while pressed against the conveyor surface by said presser rollers.

8. The invention as in claim 1 wherein said presser assembly includes a support body, each of said presser rollers being mounted on said support body, and said support body being mounted for adjustment of its spacing from such conveyor surface whereby such adjustment of said support body adjusts the nominal spacing of all of said presser rollers from said conveyor surface.

9. The invention as in claim 8 wherein each of said presser rollers is supported on said support body for free-floating adjustment toward and away from said conveyor.

10. The invention as in claim 1 wherein each of said presser rollers is mounted for idling rotation independently of each other such roller, for such engagement of articles being so conveyed along such an arcuate conveyance path on a live conveyor.

11. A conveyor which defines an arcuate conveyance path for conveying articles on a surface of said conveyor around a turn and a presser assembly as in claim 1 disposed adjacent said arcuate conveyance path whereby said presser rollers so press articles against said surface as said articles traverse said arcuate conveyance path on said conveyor.

12. A turning conveyor which comprises:
   conveyance components that define a conveyance surface which extends along an arcuate conveyance path;
   multiple presser rollers each mounted for rotation about an axis which is oriented generally radially of said arcuate conveyance path, said presser rollers being disposed in spaced relation to one another along said arcuate conveyance path and positioned with their respective axes of rotation at angles to one another along such arcuate conveyance path to press articles against said conveyance surface and to maintain the orientation of each such article relative to said conveyance path whereby such articles are turned coordinately as the direction of their conveyance movement gradually changes during traverse of said arcuate conveyance path on said conveyor surface.

13. The invention as in claim 12 wherein the spacing between adjacent ones of said rollers is less than the width of such articles as measured along said arcuate conveyance path.

14. The invention as in claim 12 wherein each said presser roller has a resiliently compressible periphery.

15. The invention as in claim 14 wherein each of said presser rollers has a significant width as measured radially of such arcuate conveyance path for pressing such articles against such a conveyance surface over said width, each of said presser rollers varying in effective diameter across said width in direct proportion to the radii of such arcuate conveyance path adjacent said presser roller, whereby each said presser roller holds such articles against such a conveyance surface in a fixed orientation relative to the conveyance path to turn the articles as they move along said arcuate conveyance path.

16. The invention as in claim 12 wherein each of said presser rollers has a truncated conical peripheral presser surface of significant width for engaging such articles on said conveyance surface along said arcuate conveyance path and is oriented with its end of lesser diameter disposed radially inward and its end of greater diameter disposed radially outward relative to said arcuate conveyance path, each of said presser rollers being mounted with its axis of rotation disposed at an angle to the conveyance surface adjacent to that roller such that the portion of said peripheral presser surface which is nearest to such adjacent conveyance surface is substantially parallel to such adjacent surface, and wherein the effective diameter of each of said presser rollers varies across the width of said presser surface thereof in direct proportion to the radii of such arcuate conveyance path across the corresponding portion of such conveyance surface that is adjacent said presser surface, whereby such articles engaged by said presser rollers are maintained in substantially the same lateral orientation relative to such a conveyance oath as they traverse said arcuate conveyance path while pressed against the conveyance surface by said presser rollers.

17. The invention as in claim 12 wherein said conveyor is a slat chain conveyor.

18. The invention as in claim 17 wherein said slat chain is provided with upstanding pusher elements at spaced positions along said slat chain for engaging and pushing such articles on said conveyor.

19. A presser assembly for retaining articles in predetermined positions relative to a conveyance path on a conveyor as those articles move along an arcuate turning portion of said path, said presser assembly comprising:
   a support body;
   a plurality of presser rollers mounted on said support body in an arcuate array corresponding to such an arcuate turning portion of a conveyance path of a conveyor, each of said presser rollers being disposed for rotation about an axis which is oriented generally radially of said arcuate array, said presser rollers being disposed in spaced relation to one another and positioned with their respective axes of rotation at angles to one another along such arcuate array to press such articles against such a conveyor through an arcuate turning portion thereof and to maintain the orientation of each such article relative to such conveyance path through such a conveyor turning portion and thereby turn each such article coordinately with the changes in direction of the conveyance path as such articles traverse such an arcuate turning portion of the conveyance path on the conveyor.

20. The invention as in claim 19 wherein the spacing between adjacent ones of said rollers is less than the width of such articles as measured along said arcuate array.

21. The invention as in claim 19 wherein each said presser roller has a resiliently compressible periphery.

22. The invention as in claim 21 wherein each of said presser rollers has a significant width as measured radially of such arcuate array for pressing such articles against such a conveyor over said width, each of said presser rollers varying in effective diameter across said width in direct proportion to the radii of such array across said width, whereby said presser rollers will hold such articles against such a conveyor in a fixed orientation relative to the conveyance path thereof as the articles move along said arcuate turning portion of such a conveyance path.

23. The invention as in claim 19 wherein each of said presser rollers has a truncated conical peripheral presser surface of significant width for engaging such articles on such an arcuate turning portion of such a conveyance path and is oriented with its end of lesser diameter disposed radially inward and its end of greater diameter disposed radially outward relative to said arcuate array, each of said presser rollers being mounted with its axis of rotation disposed such that the portion of said peripheral presser surface which is to engage articles disposed on such a conveyor will be substantially parallel to the conveyance surface of such a conveyor, said presser rollers thereby defining an arcuate presser path of significant width as measured radially of said arcuate presser path, and wherein the proportionate differences in the effective diameters of each of said rollers across the width of said arcuate presser path are substantially the same as the proportionate differences of the lengths of said arcuate presser path across its width, whereby such articles engaged by said presser rollers will be maintained in substantially the same lateral orientation relative to such a conveyance path as they traverse such a turning portion of such a conveyance path while pressed against the conveyor by said presser rollers.

24. The invention as in claim 19 including means for mounting said support body for adjustment of its spacing from such a conveyor whereby such adjustment of said support body adjusts the nominal spacing of all of said pressers rollers from said conveyor.

25. The invention as in claim 24 wherein each of said presser rollers is supported on said support body for free-floating adjustment relative to said support body, in a direction toward and away from a conveyor on which said support body is mounted.

26. The invention as in claim 19 wherein at least one of said presser rollers is mounted on said support body in a predetermined position relative to said arcuate array and at least one of said presser rollers is mounted for selective adjustment along said arcuate array.

27. The invention as in claim 19 wherein a series of said presser rollers are mounted on said support body in predetermined positions along said arcuate array, and including at least one said presser roller adjacent each end of said series which is mounted for selective adjustment along said arcuate array.

* * * * *